United States Patent [19]

Black et al.

[11] Patent Number: 4,857,201

[45] Date of Patent: Aug. 15, 1989

[54] REVERSE OSMOSIS CELLULOSE AND CELLULOSIC MEMBRANES PREPARED BY REPEATED DRYING AND REWETTING

[75] Inventors: Laura E. Black; Wan-Kei Wan, both of Sarnia, Canada

[73] Assignee: Exxon Research and Engineering Company, Florham Park, N.J.

[21] Appl. No.: 236,804

[22] Filed: Aug. 26, 1988

[51] Int. Cl.$^4$ .............................................. B01D 13/00
[52] U.S. Cl. .................................. 210/655; 210/500.29
[58] Field of Search ................ 210/500.3, 500.29, 655; 264/41

[56] References Cited

U.S. PATENT DOCUMENTS

| | | | |
|---|---|---|---|
| 3,228,876 | 1/1966 | Mahon | 210/22 |
| 3,592,672 | 7/1971 | Rowley et al. | 210/500.3 X |
| 3,884,801 | 5/1975 | Kesting | 210/500.3 X |

*Primary Examiner*—Frank Spear
*Attorney, Agent, or Firm*—Joseph J. Allocca

[57] ABSTRACT

The ability of cellulose membranes to separate solutes from solvents under reverse osmosis conditions is significantly improved by subjecting the membrane prior to use to several cycles of drying and rewetting.

14 Claims, No Drawings ns is improved by subjecting the water wet membranes, prior to use, to several cycles of drying, rewetting in water, and redrying. The water wet cellulose
REVERSE OSMOSIS CELLULOSE AND CELLULOSIC MEMBRANES PREPARED BY REPEATED DRYING AND REWETTING

DESCRIPTION OF THE INVENTION

The percent solute rejection exhibited by cellulose and cellulosic membranes under reverse osmosis conditions is improved by subjecting the water wet membranes, prior to use, to several cycles of drying, rewetting in water, and redrying. The water wet cellulose and cellulosic membranes are dried at about 5° to 125° C. and resoaked in water. Multiple cycles can be employed but at least 2 cycles are preferred. Rewetting times of about 2 to 264 hours, preferably about 24 to 48 hours are employed. Drying temperature of between 5° to 125° C., preferably 80° to 100° C. and drying times of less than 1 to 100 hours, preferably 20 to 40 hours are also employed. Following the last drying cycle, the membrane can be employed under reverse osmosis conditions, i.e. an applied pressure of about 400 to 1000 psig, preferably 400 to 600 psig for a variety of separations, including water/inorganic salts, water/organics, and organics/organics. The membrane finds particular utility for the recovery of extraction solvents such as N-methyl-pyrrolidone from extract and/or raffinate phases in extraction processes.

BACKGROUND OF THE INVENTION

The cellulose membranes which are subsequently subjected to the repeated drying-rewetting procedure can be made by any of the common techniques. Thus, regenerated cellulose made by the cuprammonium process and known as cuprophane and regenerated cellulose made by the xanthate process and known as cellphane can be employed. Recently, additional solvents have been found which are capable of dissolving cellulose. These solvents include ammonium thiocyanate in liquid ammonia, lithium chloride in dimethyl acetamide, N-methyl-morpholine-N-oxide, dinitrogen tetroxide/dimethyl formamide and dimethylsulfoxide/paraformaldehyde. Cellulose membranes made relying on these solvent systems can also be used in the present invention.

The lithium chloride/dimethyl acetamide solvent is particularly useful for membrane preparation since cellulose solutions which are very stable and do not degrade can be prepared at room temperature. When using that solvent system a gelation solvent of tetrahydrofuran at 2° C. is preferred (see Kobunshi Ronbunshu 41 (9) 501-9, 1984; also see JP No. 60-187307 Sept. 24, 1985)

It is known that drying regenerated cellulose membrane in the absence of any swelling or softening agent causes collapse of the internal structure of the membrane by causing intra chain hydrogen bonding. See U.S. Pat. No. 4,496,456. This can result in an increase in the membrane's rejection behavior toward particular feed components under reverse osmosis conditions. This drying usually is for up to 48 hours at up to 60° C. and causes an increase in rejection and a decrease in flux. The percent rejection reported typically increases until it reaches a steady value. Further increases of either the drying temperature or time do not lead to further increases in rejection.

It is known that regenerated cellulose can be used under several osmosis conditions to separate extraction solvents such as NMP from raffinate or extract oil under reverse osmosis conditions. Such a process is disclosed and claimed in U.S. Pat. No. 4,510,047.

However, the literature does not suggest the effect repeated membrane drying and rewetting will have on membrane performance, i.e., selectivity/rejection and flux, for such separations.

THE INVENTION

It has been discovered that the selectivity of cellulose and cellulosic membranes (e.g. cellulose esters, cellulose ethers and mixed cellulose ether-ester membranes) under reverse osmosis conditions can be improved by repeated drying, rewetting in water, and drying of the membrane. This improvement is much greater than that observed after a single drying cycle. While the repeated drying-rewetting cycles are expected to benefit both cellulose and cellulosic membranes, the preferred membranes for treatment in accordance with this invention are the cellulose membranes. It is preferred that at least 2 drying and rewetting cycles be used. Drying is conducted at a temperature in the range 5° to 125° C., preferably 80° to 100° C., for from less than 1 hour to 100 hours, preferably 20 to 40 hours. The membranes are dried by placing them in dry, flowing nitrogen. Other dry gases can also be used. The relative humidity of the gases should preferably be less than about 25%. Rewetting is conducted by immersing in or otherwise contacting the drying membrane with water or any substantially (i.e. >50%) aqueous system at 5° to 100° C., preferably 20° to 40° C. for from 2 to 264 hours, preferably 24 to 48 hours. Following the last rewetting the membrane is dried and then used under reverse osmosis conditions. Reverse osmosis conditions constitute operating at a pressure sufficient to overcome the osmotic pressure of the component one seeks to permeate. Typical reverse osmosis pressures range up to 1000 psig, preferably between 100 to 800 psig, most preferably 200 to 600 psig.

In a particular application, the pretreated membrane is used to separate extraction solvent from raffinate or extract oil under reverse osmosis conditions. In such a process oil is contacted with an extraction solvent such as furfural, phenol, NMP etc. to selectively remove aromatics from the oil producing a raffinate of low aromatic content and an extract of high aromatic content. Both the raffinate and extract, however, contain extraction solvent. The extraction solvent is recovered by contacting the raffinate or extract stream with the cellulose membrane at a temperature in the range of 20° C. to 110° C. and at an applied pressure sufficient to overcome the osmotic pressure, about 400 to 1000 psig. The extraction solvent preferably permeates through the membrane and is recycled to the extraction process. When used in this particular service, special adhesives and permeates and retentate spacers are required to produce the spiral wound elements typically used. These aspects of spiral wound element construction for extraction solvent recovery are disclosed and claimed in U.S. Pat. No. 4,582,726.

It has been found that thinner membranes which have been subjected to the multi-cycle drying/rewetting procedure of the present invention exhibit higher fluxes, while retaining high selectivity. Membranes of about 25 microns and less are useable, preferably 20 microns thick or less, more preferably 10 microns thick or less. Thinner membranes, because they are more difficult to handle, are preferably cast upon a porous backing support. Such porous backing supports are selected from teflon, polypropylene, polyethylene, nylon, polyester, cellulose, etc. These support backings are extremely porous and serve solely as a support. In general the support backing is 10 to 100 microns thick and has a pore size of 0.01 to 10 microns, preferably 0.01 to 1 micron. When using hydrophobic materials as the support backing, it is preferred that some surfactant be employed to insure complete wetting of the backing by the cellulose casting solution. Examples of such surfactants include fluoro surfactants and hydrocarbon surfactants.

The membrane can be used as sheets, tubes, hollow fibers etc. Membranes in sheet form can be fabricated into spiral wound elements.

The present invention will be better understood by reference to the following non-limiting examples.

EXAMPLE 1

Cellulose membranes were prepared using the following procedure.

A sample of lithium chloride (Aldrich catalog #21,323-3) was dried in a vacuum oven at 110° C. for 2 hours. Reagent grade dimethylacetamide was dried over 3A molecular sieves. The lithium chloride was dissolved in the dimethylacetamide at 100° C. for 1 hour to from a 9% LiCl solution which was allowed to cool to room temperature. The solution contained approximately 0.1% water.

In order to effect dissolution of cellulose at room temperature (Macromolecules 1985,18,2394-2401), 40 grams of micro-crystalline cellulose (Baker TLC reagent catalog #1-1529) were soaked in 500 mls of de-ionixed water overnight. The water was decanted off and 400 mls of methanol was added to the wet cellulose. The methanol was decanted off and another 400 mls of methanol was added to the cellulose. This was decanted off and the above procedure was repeated an additional 2 times. This procedure displaced water from the cellulose and replaced it with methanol. After the decantation of the final addition of methanol, the above procedure was repeated 5 times with dimethylacetamide to displace all of the methanol from the cellulose. The final addition of dimethylacetamide was decanted from the cellulose and the wet powder was partially dried under nitrogen until the cellulose concentration in the wet powder was approximately 35%.

The amount of cellulose in the partially dried material was accurately determined by drying a sample in a vacuum oven at 100° C. for several hours. Solutions containing 8, 6 and 4% cellulose were prepared by stirring the partially dried cellulose in the dimethylacetamide solution at room temperature for several days.

A thin film of the 8% cellulose solution was cast on a glass plate using a 5 mil clearance casting knife. The membrane was allowed to evaporate in an oven for 30 minutes at 50° C., then precipitated in 2° C. tetrahydrofuran for 1 day followed by a solvent exchange in water for several days. The thickness of the water-wet membrane was 25 microns.

Various samples of the water wet membrane were dried under nitrogen for various times and temperatures. Some of the dried samples were resoaked in water for various times and redried. Some of these samples underwent a third drying cycle employing a repeat of the conditions described above.

Thin films of the 6 and 4% cellulose solutions were cast on a 0.2 micron pore size teflon membrane (from W.L. Gore & Associates, Inc.) using a 5 mil clearance casting knife. A small amount (0.1%) of a fluorosurfactant, Zonyl FSN, from Dupont was added to the 4% solution to ensure wetting of the teflon. Most of these membranes were immediately precipitated in room temperature water and then subjected to several drying cycles.

The membrane performance was tested by circulating a sample of 150N extract oil in NMP over the membranes at 70° C. at an applied feed pressure of 500 psig. The permeate yield was kept below 5% to ensure that the feed composition did not change during testing. The membrane flux was recorded and the volume percent oil in both the feed and the permeate samples was measured.

The results of using these various samples are presented in Tables 1, 2 and 3.

TABLE 1

PERFORMANCE OF CELLULOSE MEMBRANES AFTER SINGLE DRYING CYCLE

| Temperature = | 70° C. |
| Pressure = | 500 PSIG |
| Feed = | 12 vol % 150N extract oil/NMP |
| Membrane = | 8% cellulose in LiCl/DMAC evaporation time = 30 minutes at 50° C. precipitated in 2° C. THF solvent exchanged with water dried under nitrogen |

| Drying Time* (hours) | Drying Temp °C. | Vol % oil in Permeate | % oil Rejection | Flux (25μ membrane) L/m²day |
|---|---|---|---|---|
| 0 | — | 10.4 | 13 | 1310 |
| 20 | 50 | 6 | 50 | 379 |
| 20 | 76 | 5.0 | 58 | 279 |
| 20 | 100 | 3.4 | 72 | 104 |
| 91 | 100 | 3.6 | 70 | 145 |
| 20 | 124 | 4.0 | 67 | 149 |

*indicates time membrane dried under nitrogen at indicated temperature before testing.

TABLE 2
PERFORMANCE OF CELLULOSE MEMBRANES AFTER SEVERAL DRYING CYCLES

Temperature = 70° C.
Pressure = 500 PSIG
Feed = 12 vol % 150N extract oil/NMP
Membrane = 8% cellulose in LiCl/DMAC
evaporation time = 30 minutes at 50° C.
precipitated in 2° C. THF, solvent exchanged
with water, dried under nitrogen for 20 hours
at 100° C. for each drying cycle

| # of drying cycles | time of water soak between cycles (hr.) between 1 & 2 | between 2 & 3 | vol % oil in permeate | % oil rejection | flux $l/m^2 day$ |
|---|---|---|---|---|---|
| 1* | — | — | 3.4 | 72 | 104 |
| 2 | 1 | — | 2.6 | 78 | 66 |
| 3 | 1 | 1 | 2.3 | 80.5 | 86 |
| 3** | 264 | 1 | 1.3 | 89 | 28 |

*per Table 1
**temperature of 1st drying cycle was 78° C.

TABLE 3
PERFORMANCE OF CELLULOSE MEMBRANES ON TEFLON BACKING

Temperature = 70° C.
Pressure = 500 PSIG
Feed = 12 vol % 150N extract oil/NMP
Membrane = 4% or 6% cellulose in LiCl/DMAC on 0.2μ
teflon precipitated in room temperature water
3 drying cycles under nitrogen - each
cycle for 28 hours at 100° C.
water soak time between drying cycles
was 2 days

| wt % cellulose | % FSN surfactant | vol % oil in permeate | % oil rejection | flux $l/m^2 day$ |
|---|---|---|---|---|
| 6* | — | 1.2 | 90 | 35 |
| 6 | — | 1.3 | 89 | 48 |
| 4 | 0.1 | 2.1 | 82 | 166 |

*membrane evaporated for 30 minutes at 50° C. before precipitated in 2° C. THF followed by solvent exchange with water.

From Table 1, it is seen that a single drying cycle of the water wet cellulose membranes; lasting for an extended period of time, improved the oil rejection and reduced the flux. An optimum drying condition was 20 hours at 100° C. which resulted in a membrane with roughly 70 vol % oil rejection compared to a membrane showing 13 vol % oil rejection which had not undergone drying.

Literature suggests that drying of cellulose membranes causes collapse of the internal structure by intra-chain hydrogen bonding between hydroxyl groups. This hydrogen bonding is irreversible and results in an tighter membrane. A membrane dried for 20 hours at 100° C. had a much improved oil rejection of 72% (versus 13%) with a lower flux of 104 $l/m^2 day$ (versus 1310 $l/m^2 day$). Membranes dried at a lower temperature, had a lower rejection and a higher flux. However, increasing the drying time or raising the drying temperature beyond these conditions did not change the membrane performance significantly. Literature also suggests a limit to the degree of hydrogen bonding attainable by drying. It appeared that the maximum amount of hydrogen bonding had occurred.

In an attempt to further increase the oil rejection, a membrane made from an 8% cellulose solution that had been dried for 20 hours at 100° C. was resoaked in water for 1 hour and then redried. As shown in Table 2, the membrane that underwent the second drying cycle had an oil rejection of 78% and a flux of 66 $l/m^2 day$ in comparison to values of 72% and 104 $l/m^2 day$ for the membrane that underwent a single drying cycle. The second drying cycle significantly increased the oil rejection. A membrane that underwent a third drying cycle showed only a small further increase in oil rejection to 80.5%.

Another important factor in the drying cycles was the length of time the membranes soaked in water between the drying cycles. A membrane that was allowed to soak for 11 days between the first and second drying cycles and for 1 hour between the second and third drying cycles had a significantly higher oil rejection of 89 vol % and a flux of 28 $l/m^2 day$.

As shown in Table 3, a membrane prepared from the 6% cellulose solution and subjected to 3 drying cycles of 20 hours at 100° C. and a 2 day water soak between each cycle had an oil rejection of 90% and a flux of 35 $l/m^2 day$. This flux was slightly higher than the flux of 28 $l/m^2 day$ observed with the 8% cellulose membrane. The next membrane prepared from the 6% cellulose solution was not evaporated before being precipitated directly into room temperature water. After undergoing three drying cycles with 2 day soaks between each cycle, it had an oil rejection of 89% and a flux of 48 $l/m^2 day$. Simplifying the casting procedure did not affect the final high rejection but did improve the flux significantly.

The 4% cellulose solution required the addition of a fluorosurfactant to ensure complete wetting of the Teflon ultrafiltration membrane. This membrane was immediately precipitated into water after casting and was subjected to three drying cycles with 2 day soaks between each cycle. It exhibited an oil rejection of 82% and a flux of 166 $l/m^2 day$. For the same rejection values, the fluxes exhibited by the membranes prepared from the 6 and 4% cellulose solutions are significantly higher than for the membranes prepared from the 8% cellulose solutions. Reducing the cellulose concentration in the casting solution increased the observed flux.

What is claimed is:

1. A method for improving the solute selectivity of cellulose or cellulosic membranes used for the separation of organic mixtures said method comprising the steps of drying a water wet cellulose or cellulosic membrane, rewetting the dried membrane, and redrying the membrane.

2. The method of claim 1 wherein the membrane is subjected to multiple drying, rewetting, and drying cycles.

3. The method of claim 2 wherein the membrane is subjected to 2 drying, rewetting and drying cycles.

4. The method of claim 1 wherein the drying temperature is between 5° to 125° C. and the drying times of less than 1 to 100 hours.

5. The method of claim 1 wherein rewetting is conducted for a period of from 2 to 264 hours.

6. The membrane of claim 1, 2, 3, 4 or 5 wherein the membrane which is subjected to the drying, rewetting, and redrying cycles is regenerated cellulose.

7. In a method for separating extraction solvents from extract or raffinate phases by selectively permeating the extraction solvent through a cellulose or cellulosic membrane under reverse conditions, the improvement comprising using a cellulose or cellulosic membrane which has been dried, rewet and redried before being used to effect the desired separation.

8. The method of claim 7 wherein the membrane has been subjected to multiple drying, rewetting, and redrying cycles.

9. The method of claim 8 wherein the membrane has been subjected to at least 2 drying, rewetting, and redrying cycles.

10. The method of claim 7, 8 or 9 wherein the drying temperature is between 5° to 125° C., the drying time is less than 1 hour to 100 hours, and the rewetting is for a period of 2 to 264 hours.

11. A regenerated cellulose membrane of improved solute selectivity made by the method of drying a water wet regenerated cellulose membrane, rewetting the dried membrane, and redrying the membrane.

12. The membrane of claim 11 wherein the membrane is subjected to multiple drying, rewetting, and drying cycles.

13. The membrane of claim 11 wherein the drying temperature is between 5° to 125° C. and drying times of less than 1 hour to 100 hours.

14. The membrane of claim 1 wherein rewetting is conducted for a period of from 2 to 264 hours.

* * * * *